Patented Feb. 5, 1929.

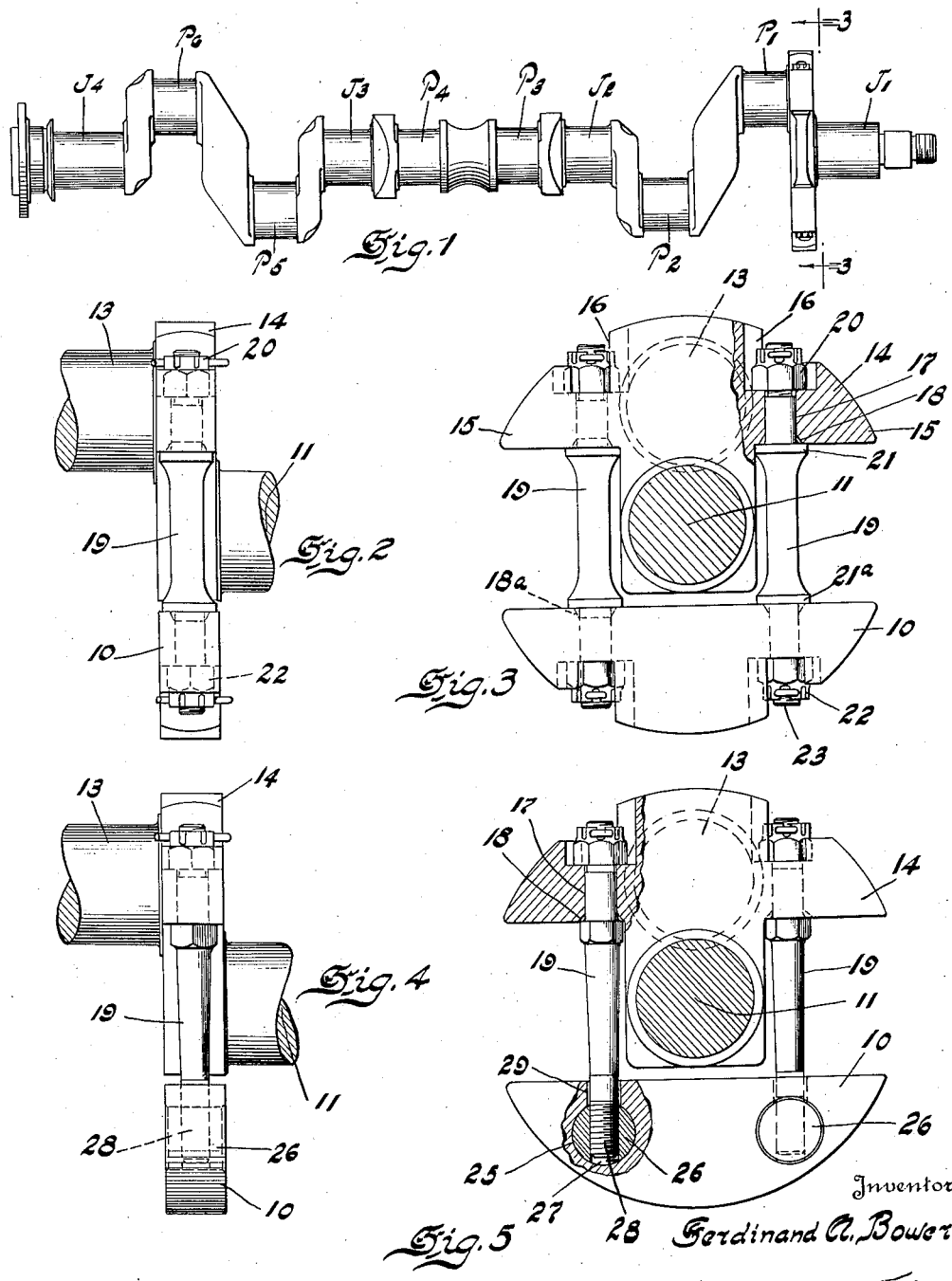

1,701,402

UNITED STATES PATENT OFFICE.

FERDINAND A. BOWER, OF FLINT, MICHIGAN, ASSIGNOR TO GENERAL MOTORS CORPORATION, OF DETROIT, MICHIGAN, A CORPORATION OF DELAWARE.

VIBRATION NEUTRALIZER.

Application filed March 22, 1926. Serial No. 96,564.

This invention relates to the type of devices for neutralizing torsional vibrations in crank shafts that is disclosed in an application of C. E. Summers, Ser. No. 10,640, filed February 20th, 1925.

An object of this invention is to eliminate or minimize friction in vibration neutralizers of this type; another is to simplify the construction.

In the accompanying drawings in which like reference characters indicate like parts throughout the several views, Fig. 1 is an elevation of a crank shaft having thereon a vibration neutralizer constructed in accordance with this invention;

Fig. 2 is an enlarged elevation of the vibration neutralizer viewed from one side of a crank shaft;

Fig. 3 is a section on the line 3—3 of Fig. 1 showing a part of the structure beyond the section line broken away;

Fig. 4 is a view similar to Fig. 2, of a modification; and

Fig. 5 is a view similar to Fig. 3 of the modification.

In Fig. 1 there is shown a six throw crank shaft having four journals. The front journal is indicated by J1, the two intermediate journals by J2 and J3 respectively and the rear journal by J4. Crank pins P1, P2 and P3 in the front half of the shaft are disposed angularly about the axis of the shaft, 120 degrees apart and crank pins P4, P5 and P6 are similarly arranged on the after half of the shaft. The axes of pins P3 and P4 are in one straight line; the axes of pins P2 and P5 are in another straight line and the axes of pins P1 and P6 are in a third straight line, said lines being angularly disposed about the center of the crank shaft 120 degrees apart. This is a usual arrangement in six cylinder automobile engines where the six cylinders are arranged in line.

The vibration neutralizer may be arranged anywhere along the shaft, but is preferably placed at the front end, or end opposite the usual fly wheel, where the amplitude of vibration is greatest when resonance occurs. As shown in Fig. 3, the vibration neutralizer is disposed within the front and rear planes of the foremost crank arm.

The vibration neutralizer forming the subject of this application comprises a body 10 which is eccentrically placed with respect to the axis 11 of the crank shaft. In the embodiment illustrated the body 10 is in form a segment of a cylinder. Inasmuch as the body 10 involves the addition of an eccentrically disposed weight to a crank shaft constructed to be in static balance without the body 10 it is necessary to apply an opposite weight equal in balancing effect in order still to maintain the crank shaft in static balance when the body 10 is added For this purpose the mass on the crank arm 13 is increased above what it would be without the vibration neutralizer by the addition of a segment-like mass 14, the end portions 15 of which extend outward on opposite sides of the arm transversely of the crank shaft. The mass 14 is provided with seats 16 upon its outer surface for a purpose which will presently appear. The mass 14 is drilled through from side to side forming parallel holes 17, the outer ends of the drill holes penetrating the seats 16. As shown in Fig. 3, the inner ends of the holes 17 are countersunk or relieved as at 18.

Bar springs 19 are fitted in the holes 17 of the mass 14. Their threaded ends extend into the seats 16 and are engaged by nuts 20 which secure said bar springs to the mass 14 and consequently to the crank shaft. Shoulders 21 may be formed on the bar springs so that they may be clamped tightly against the inner surface of the segmental mass 14. The relieved portions 18 of the holes 17 are for the purpose of avoiding sharp angular contact which might tend to crystallize and break the springs 19 when they are subjected to severe vibration. The vibration neutralizing weight or body 10 may be drilled in substantially the same manner as the mass 14 and may have seats into which the drill holes open in order to accommodate clamping nuts 22 which are screwed on threaded ends 23 of said springs 19. Shoulders 21$^a$ may also be formed on the springs 19 to engage the inner face of the body 10. Similarly it may have relieving recesses 18$^a$ where the springs enter the body.

The modification shown in Figs. 4 and 5, differs from that shown in the other views only in the means of connecting the springs to the vibration neutralizing body 10. In this form of the invention body 10 is drilled through from side to side parallel with the crank shaft axis as shown at 25. In the seats 25 thus formed are arranged cylindrical nuts or bearing members 26 having transverse threaded openings 27 for the reception of threaded ends 28 on the bar springs 19. The seats 25 communicate by transverse holes 29 with the inner surface of the body. These holes 29 are penetrated by the springs 19, that portion of each spring which is within a hole 29 being considerably smaller than that hole. This construction permits the body or weight 10 to vibrate without bending the springs sharply about sharp corners at the zone where they enter the weight. Each nut 26 being free to rotate in its seat, there can be no sharp bending of the springs 19 across a fulcrum point on the vibratory body.

When the weight of the body 10 and the stiffness of the springs 19 are so calculated with respect to the mass and proportion of the crank shaft that the oscillation period of the weight is substantially the same as the natural oscillation period of the crank shaft in accordance with the theory of coupled vibrating bodies, said weight 10 when set into vibration by the resonant vibrations of the crank shaft will vibrate at substantially the same frequency as the crank shaft, but by reason of lag, will vibrate out of phase relation with respect to the crank shaft and thus tend to neutralize vibrations in the shaft.

It will be obvious that the invention may be embodied in crank shafts having a different number of crank pins or a different number of journals than in the embodiment selected for exemplification.

Although I have described and illustrated a preferred embodiment of my invention in order to comply with the requirements of the statute, it is not intended that this invention shall be limited to the particular form shown, but only by the definition of the appended claims.

What I claim is:

1. A shaft of resilient material susceptible of vibrating torsionally, a vibratory body disposed eccentrically with respect to the shaft axis, at least one laterally projecting bar spring connecting said body to a vibratory portion of the shaft, means for balancing the shaft statically, the body with its spring connection being so proportioned with respect to the shaft that vibrations of the body induced by vibrations of the shaft will be out of phase with the vibrations of the shaft.

2. A shaft of resilient material susceptible of vibrating torsionally, a vibratory body disposed eccentrically with respect to the shaft axis, parallel bar springs connecting said body to a vibratory portion of the shaft and means for balancing the shaft statically.

3. A shaft of resilient material susceptible of vibrating torsionally, a vibratory body disposed eccentrically with respect to the shaft axis, an off center mass equivalent in balancing effect to the vibratory body connected on the other side of the shaft axis and bar springs connecting said off center mass to the vibratory body.

4. A crank shaft of resilient material susceptible of vibrating torsionally, one of the crank arms having lateral extensions, a vibratory body disposed on the opposite side of the axis of said shaft with respect to said extensions, and parallel bar springs connecting the vibratory body with the lateral extensions on the crank arm.

5. A crank shaft of resilient material susceptible of vibrating torsionally, one of the crank arms of said shaft having lateral extensions, a vibratory body disposed on the opposite side of the axis of the said shaft with respect to said extensions, said body and extensions being provided with holes, and bar springs seated in said holes, said springs forming connections between said lateral extensions and the body on opposite sides of the crank shaft axis.

6. A crank shaft of resilient material susceptible of vibrating torsionally, one of the crank arms of said shaft having lateral extensions, a vibratory body disposed on the opposite side of the axis of said shaft with respect to said extensions, said body and extensions being provided with holes, bar springs seated in said holes, shoulders on the bar springs abutting the extension and nuts threaded on the extremity of said springs for securing them to the extensions.

7. A shaft of resilient material susceptible of vibrating torsionally, a vibratory body, and parallel bar springs connecting said body to the shaft, said vibratory body being provided with transverse seats, cylindrical nuts in said seats threaded to said springs, said vibratory body having openings extending transversely of the seats and surrounding the bar springs which are threaded to the cylindrical nuts, said openings surrounding the springs being substantially larger than the springs.

In testimony whereof I affix my signature.

FERDINAND A. BOWER.